Jan. 25, 1927.  
H. BANY  
1,615,670  
SYSTEM OF ELECTRIC DISTRIBUTION  
Filed June 15, 1925
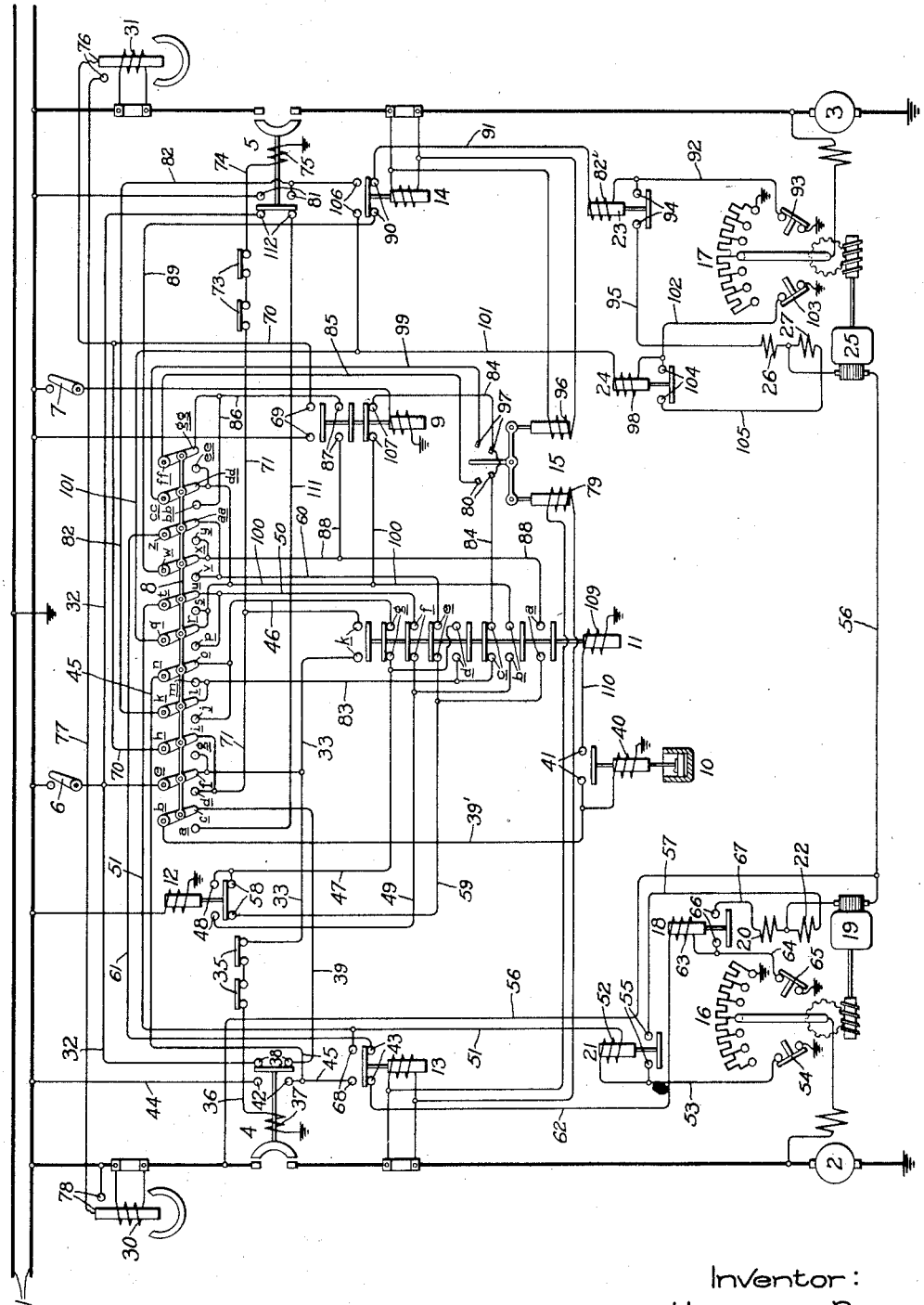
Inventor:  
Herman Bany,  
by *Alexander S. [signature]*  
His Attorney.

Patented Jan. 25, 1927.

1,615,670

UNITED STATES PATENT OFFICE.

HERMAN BANY, OF SCOTIA, NEW YORK, ASSIGNOR TO GENERAL ELECTRIC COMPANY, A CORPORATION OF NEW YORK.

SYSTEM OF ELECTRIC DISTRIBUTION.

Application filed June 15, 1925. Serial No. 37,154.

My invention relates to a system of electric distribution and particularly to a system in which a load circuit is adapted to be supplied by a plurality of sources of current.

One object of my invention is to provide an arrangement for gradually decreasing the output of a source to a predetermined value before it is disconnected from the system so as to prevent a sudden increase in the load on the other sources connected to the system.

Another object of my invention is to provide an improved regulating system for maintaining the load properly divided between the sources when a plurality of sources are connected to the system.

Another object of my invention is to provide in a system in which a plurality of sources may be connected to the system in different sequences, an arrangement whereby the first source connected to the system is regulated to maintain the voltage of the system constant and the second source to be connected is regulated to maintain a predetermined division of the load between the two sources.

Further objects will appear and my invention will be better understood from the following description taken in connection with the accompanying drawing, and its scope will be pointed out in the appended claims.

Referring to the accompanying drawing, which shows diagrammatically an electric system embodying my invention, 1 represents a direct current load circuit which is adapted to be supplied by a plurality of sources of current which may be of any suitable type, as shown in the drawing the load circuit is arranged to be supplied by the generators 2 and 3. In order to simplify the disclosure, I have shown a load circuit which has the ground as one side thereof, but it is evident that my invention is not limited to such a system.

The generator 2 is arranged to be connected to the load circuit 1 by means of the circuit breaker 4 and the generator 3 is arranged to be connected to the load circuit 1 by means of the circuit breaker 5. These circuit breakers may be of any suitable type.

6 represents a master element, shown as a hand switch, which is arranged to be operated to effect the closing of one of the circuit breakers when it is desired to connect one of the generators to the load circuit, and 7 represents a master element shown as a hand switch, which is operated to effect the closing of the circuit breaker associated with the unconnected source when it is desired to connect a second source to the load circuit. While I have shown the master elements 6 and 7 as hand switches, it is evident that each may be any suitable control device automatic or manual, examples of which are well known. 8 is a change over switch which determines by its position which circuit breaker is operated when the master elements 6 and 7 are operated. When the change over switch 8 is in the position shown in the drawing, the closing of the master element 6 effects the closing of the circuit breaker 4, and the subsequent closing of the master element 7, while the circuit breaker 4, is closed effects the closing of the circuit breaker 5. Therefore, generator 2 is the leading machine and generator 3 is the trailing machine. When the change over switch 8 occupies its other position, the closing of master element 6 effects the closing of the circuit breaker 5 and the subsequent closing of the master element 7 effects the closing of the circuit breaker 4 so that generator 3 is the leading machine and generator 2 is the trailing machine. 9 is an auxiliary control relay associated with the master element 7.

In order to simplify the drawing I have shown the master elements 6 and 7 as directly controlling the circuit breakers 4 and 5. In actual practice, however, the master elements 6 and 7 may control automatic switching means of any suitable type whereby the sources 2 and 3 are automatically started before they are connected to the load circuit. Examples of such automatic switching means are well known in the art, and since they do not constitute a part of my invention, I deem it unnecessary to show such means in detail.

In order that the trailing machine may be connected to the load circuit in case the leading machine fails to be connected thereto when the master element 6 is operated to effect its connection, a time delay relay 10 is provided which effects the operation of a throw over contactor 11 to effect the closing of the circuit breaker associated with the trailing machine if the circuit breaker associated with the leading machine is not closed within a predetermined time after the operation of the master element 6.

The voltage and load regulating system for the two generators comprises a contact making voltmeter 12, a contact making ammeter 13 which is responsive to current output of the generator 2, a contact making ammeter 14 which is responsive to the current output of the generator 3 and a differential relay 15 which is responsive to the difference between the current outputs of the two generators. These devices are so arranged that when either machine is operating alone the voltage of the load circuit is maintained constant until the current output reaches a predetermined value when the current output of the machine is maintained constant. When both machines are operating in parallel the voltage of the load circuit is maintained constant and the proper division of the load is maintained between the two generators. In case the current output of either machine reaches a predetermined value, the current output thereof is prevented from exceeding this value.

16 and 17 are motor operated rheostats in the field circuits of the generators 2 and 3 respectively, which are controlled to maintain the desired voltage and current conditions. 18 is a voltage raising control relay which is associated with the rheostat 16 and which, when energized, completes a circuit for the motor 19 and its field winding 20 so that the motor operates in a direction to cut out resistance in the field circuit of the generator 2. 21 is a voltage lowering control relay which is associated with the rheostat 16 and which, when energized, completes a circuit for the motor 19 and its field winding 22 so that the motor operates in a direction to insert resistance in the field circuit of the generator 2. 23 and 24 are voltage raising and voltage lowering control relays, respectively, which are associated with the rheostat 17 and which, when energized, complete circuits for the motor 25 and its field windings 26 and 27 so that the motor operates in the proper direction to cut resistance out of and insert it in the field circuit of the generator 3.

30 and 31 are reverse power relays in the circuits of the generators 2 and 3 respectively, which are used to effect, in a manner hereinafter described, the shutting down of the trailing unit when the two units are in operation and the output of the trailing unit has been so reduced that reverse current flows through the trailing unit.

The operation of the system shown is as follows:—

When both generators are not in use and it is desired to connect one of them to the load current, the change over switch 8 is placed in the position which makes the generator to be connected the leading machine and then the master element 6 is operated. It will be assumed that change over switch 8 is in the position shown in the drawing, when the master element 6 is closed. Also in order to simplify the drawing it is assumed that the load circuit is energized from some other source not shown, otherwise some other suitable control source examples of which are well known in the art, would have to be provided in order to operate the various electrically operated control devices.

The closing of the master element 6 completes two circuits. One of these circuits is from the ungrounded side of the load circuit 1, through the master element 6, conductor 32, contacts $e$ and $f$ of the change over switch 8, conductor 33, contacts 35 of suitable protective devices (not shown) which are adapted to open their respective contacts in response to predetermined abnormal conditions of the apparatus or circuits associated with generator 2, conductor 36, closing coil 37 of the circuit breaker 4 to ground. The other circuit is from the ungrounded side of the load circuit 1, through the master element 6, conductor 32, auxiliary contacts 38 on circuit breaker 4, conductor 39, contacts $c$ and $b$ of the change over switch 8, conductor 39' coil 40 of the time relay 10 to ground.

If the generator 2 and the control apparatus associated therewith is in an operative condition so that all of the contacts 35 are closed, the circuit breaker 4 closes immediately and connects the generator 2 to the load circuit before the time relay 10 can close its contacts 41. When the circuit breaker 4 is closed, its auxiliary contacts 38 are opened and the coil 40 of the time relay 10 is deenergized. In actual practice, the circuit breaker may be controlled in any suitable manner, examples of which are well known in the art, so that it cannot close until the voltage of the generator 2 exceeds the load circuit voltage by a predetermined amount. When current flows from the generator 2 to the load circuit 1, the reverse current relay contacts 78 are closed.

The closing of the auxiliary contacts 42 on the circuit breaker 4 places the motor operated rheostat 16 under the control of the voltmeter 12, which is connected across the load circuit, and ammeter 13, which is connected in the generator circuit so that the voltage of the load circuit is maintained constant at a predetermined value as the load on the generator varies until the current output of the generator reaches a predetermined value when the voltage is varied to prevent the current output from exceeding this predetermined value. If the voltage is too high after the contacts 42 are closed, a circuit is completed from the ungrounded terminal of the load circuit, through conductor 44, contacts 42, conductor 45, contacts $n$ and $o$ of the change over switch 8, conductor 46, contacts $g$ of the contactor 11, conductor 47, contacts 48 of the voltmeter 12, which are closed when the voltage is too high, conductor 49, contacts $f$ of the contactor 11, conductor 50, contacts $u$ and $t$ of the change over switch 8, conductor 51, coil 52 of the voltage lowering control relay 21, conductor 53, limit switch 54 to ground. The closing of the contacts 55 of the voltage lowering control relay 21 completes a circuit for the motor 19 to operate the rheostat 16 so as to insert resistance in the field circuit of the generator 2 to decrease the voltage thereof to the desired value. This circuit of the motor is from the ungrounded side of the load circuit through conductor 56, armature of the motor 19, field winding 22, conductor 57, contacts 55, conductor 53, limit switch 54 to ground.

If the voltage is too low so that the voltmeter contacts 58 are closed, and the load is such that the ammeter contacts 43 are closed, a circuit is completed from the ungrounded side of the load circuit through conductor 44, contacts 42, conductor 45, contacts $n$ and $o$ of the change over switch 8, conductor 46, contacts $g$ of the contactor 11, conductor 47, voltmeter contacts 58, conductor 59, contacts $e$ of contactor 11, conductor 60, contacts $aa$ and $z$ of the change over switch 8, conductor 61, ammeter contacts 43, conductor 62, coil 63 of the voltage raising control relay 18, conductor 64, limit switch 65 to ground. The closing of the contacts 66 of the voltage raising control relay 18 completes a circuit for the motor 19 to operate the rheostat 16 so as to cut out resistance in the field circuit of the generator 2 and thereby increase its voltage. This circuit is from the ungrounded terminal of the load circuit, through conductor 56, armature of motor 19, field winding 20, conductor 67, contacts 66 of control relay 18, conductor 64, limit switch 65 to ground.

If, at any time, the current output of the generator 2 exceeds a predetermined value so that the ammeter 13 opens its contacts 43 and closes its contacts 68, a circuit is completed for the coil 52 of the voltage lowering control relay 21 to effect the operation of the motor operated rheostat 16 to decrease the generator excitation until the ammeter contacts 68 open. The closing of the contacts 68 completes a circuit between the conductors 45 and 51 in the above traced circuit of the relay coil 52.

Let it now be assumed that while the generator 2 is in operation the master element 7 is operated to effect the connection of the trailing machine to the load circuit. The closing of the master element 7 connects the auxiliary control relay 9 across the load circuit. The closing of the contacts 69 of the control relay 9 completes a circuit from the ungrounded side of the load circuit, through the contacts 69, conductor 70, contacts $h$ and $i$ of the changeover switch 8, conductor 71, contacts 73 of protective devices (not shown) which are adapted to open their respective contacts in response to predetermined abnormal conditions of the apparatus or circuits associated with generator 3, conductor 74, closing coil 75 of the circuit breaker 5 to ground. If the generator 3 and its associated apparatus and circuits are in an operative condition so that all of the contacts 73 are closed, the circuit breaker 5 closes and connects the generator 3 to the load circuit. In actual practice, the circuit breaker 5 may be controlled in any suitable manner, examples of which are well known in the art, so that the voltage of the generator 3 must exceed the load circuit voltage by a predetermined amount before the circuit breaker closes.

When the circuit breaker 5 closes, current flows from the generator 3 to the load circuit and the reverse current relay 31 closes its contacts 76, thereby completing a circuit in parallel around the contacts 69. This circuit includes the contacts 76, the conductor 77 and the contacts 78 of the reverse current relay 30, which are closed when current flows from generator 2 to the load circuit.

It will be observed that when only the generator 2 is in operation, only the coil 79 of the current differential relay 15, which is responsive to the current output of the generator 2, is energized. Therefore, the contacts 80 of the relay 15 are closed before the circuit breaker 5 closes but the circuit which includes these contacts is open at the auxiliary contacts 81 on the circuit breaker 5. When the circuit breaker 5 closes, a circuit is completed for the coil 82' of the voltage raising control relay 23. This circuit is from the ungrounded terminal of the load circuit, through the auxiliary contacts 81, conductor 82, contacts $k$ and $l$ of the changeover switch 8, conductor 83, contacts $c$ of the contactor 11, conductor 84, contacts 80 of relay 15, conductor 85, contacts $ff$ and $gg$ of the change over switch 8, conductor 86, contacts 87 of the control relay 9, conductor 88, contacts $x$ and $w$ of the change over switch 8, conductor 89, contacts 90 of the ammeter 14, conductor 91, coil 82' of the voltage raising control relay 23, conductor 92, limit switch 93 to ground. The closing of the contacts 94 of the voltage raising control relay 23 completes a circuit for the motor 25 of the motor operated rheostat 17 to operate the rheostat so that resistance is cut out of the field circuit of the generator 3 and the load on the generator 3 increases. This circuit is from the ungrounded side of the load circuit, through conductor 56, armature of the motor 25, field winding 26, conductor 95, contacts 94 of the control relay 23, conductor 92, limit switch 93 to ground. As soon as the load is divided in the desired manner between the two generators, the pull exerted by the coil 96, which is energized in response to the output of the generator 3, becomes equal to the pull exerted by the coil 79 so that the contacts 80 and the above-traced circuits of the control relay 23 and motor 25 are opened.

When the two machines are in operation, the excitation of the leading machine 2 is controlled by the voltmeter 12 and ammeter 13 in exactly the same manner as when only the leading machine is in operation. The excitation of the trailing machine is controlled by the current balanced relay 15 so as to maintain the loads on both machines substantially proportional. If the current output of the leading generator 2 tends to increase relatively to the current output of the generator 3, the coil 79 of the relay 15 predominates and the contacts 80 of the relay 15 are closed so that above traced circuits for the voltage raising control relay 23 and the motor 25 and its field winding 26 are completed to effect an increase in the excitation of the generator 3 to restore the current output thereof to the desired value relative to the output of the generator 2. If the current output of the generator 2 tends to decrease relatively to the output of the generator 3, the coil 96 of the relay 15 predominates and the contacts 97 of the relay 15 are closed and complete a circuit for the coil 98 of the voltage lowering control relay 24. This circuit is from the ungrounded side of the load circuit through auxiliary contacts 81 on the circuit breaker 5, conductor 82, contacts $k$ and $l$ of the change over switch 8, conductor 83, contacts $c$ of the contactor 11, conductor 84, contacts 97 of the relay 15, conductor 99, contacts $cc$ and $dd$ of the change over switch 8, conductor 100, contacts $r$ and $q$ of the change over switch 8, conductor 101, coil 98 of the voltage lowering control relay 24, conductor 102, limit switch 103, to ground. The closing of the contacts 104 of the control relay 24 completes a circuit for the motor 25 to operate the rheostat 17 so that resistance is inserted in the field circuit of the field winding of the generator 3 to restore the current output thereof to the desired value relative to the current output of the generator 2. This circuit is from the ungrounded side of the load circuit, through the conductor 56, armature of the motor 25, field winding 27, conductor 105, control relay contacts 104, conductor 102, limit switch 103 to ground.

It will be observed that the contacts 90 of the ammeter 14 are in the circuit of the voltage raising control relay 23 so that the excitation of the generator 3 can be increased only when the current output of the generator 3 is below a predetermined value. If the current output of the generator 3 exceeds a predetermined value so that the ammeter 14 opens its contacts 90 and closes its contacts 106, the circuit of the voltage lowering control relay 24 is completed independently of the contacts 97 of the relay 15 to effect a decrease in the excitation of the generator 3. The closing of the contacts 106 connects directly together the conductors 82 and 101 in the above traced circuit of the coil 98 of the voltage lowering control relay 24.

From the above description it will be observed that under normal load conditions the excitation of the leading machine is controlled by the voltmeter 12 and the excitation of the trailing machine is controlled by the current balance relay 15.

When it is desired to shut down the trailing machine, the master element 7 is opened so that control relay 9 is deenergized and its contacts 69 and 87 are opened and its contacts 107 are closed.

The opening of the contacts 87 interrupts the above traced circuit for the voltage raising control relay 23 so that it is impossible for the automatic load regulating apparatus to increase excitation of the generator 3 after the master element 7 has been operated to effect the disconnection of the trailing machine.

The opening of the contacts 69 opens the original energizing circuit of the closing coil 75 of the circuit breaker 5, but this coil remains energized since its heretofore described circuit through the contacts 76 and 78 of the reverse current relays 31 and 30 respectively is still complete. This circuit is not opened until the excitation of the trailing machine 3 has been decreased sufficiently to shift all of its load to the leading machine 2.

The shifting of the load is effected by the closing of the contacts 107 of the control relay 9. When these contacts are closed and the circuit breaker 5 is also closed, a circuit is completed for the voltage lowering control relay 24 to decrease the excitation of the trailing machine 3. This circuit is from the ungrounded side of the load circuit through the auxiliary contacts 81 on the circuit breaker 5, conductor 82, contacts $k$ and $l$ of the change over switch 8, conductor 83, contacts $c$ of the contactor 11, conductor 84, contacts 107 of the control relay 9, conductor 100, contacts $r$ and $q$ of the change over switch 8, conductor 101, coil 98 of the voltage lowering control relay 24, conductor 102, limit switch 103 to ground. The control relay 24 effects in the manner above described a gradual decrease in the excitation of the generator 3. When the excitation has been reduced sufficiently to cause a current to flow from the load circuit to the machine 3, the reverse current relay 31 opens its contacts 76 and interrupts the circuit of the closing coil 75 of the circuit breaker 5. The circuit breaker 5 then opens and disconnects the trailing machine 3 from the load circuit. The opening of the auxiliary contacts 81 on the circuit breaker interrupts the last traced circuit of the control relay 24 so that further reduction in the excitation of generator 3 is prevented by the automatic regulating arrangement after the generator is disconnected.

The disconnection of the leading generator 2, when it is operating alone, is effected normally by the opening of the master element 6, which directly opens the above traced circuit of the closing coil 37 of the circuit breaker 4.

If for any reason whatever, the circuit breaker 4 fails to close within a predetermined time after the master element 6 has been operated to effect its closing or the circuit breaker is opened by the operation of one of the protective devices associated with the leading source 2 and remains open for a predetermined length of time, the time relay 10, which is energized in a manner above described by the auxiliary contacts 38 on the circuit breaker 4, closes its contacts 41 and completes a circuit for the coil 109 of the contactor 11. This circuit is from the ungrounded terminal of the load circuit through the master element 6, conductor 32, auxiliary contacts 38 on the circuit breaker 4, conductor 39, contacts $c$ and $b$ of the change over switch 8, conductor 39′, contacts 41 of the time relay 10 conductor 110, coil 109 of the contactor 11 to ground.

The contactor 11, by closing its contacts $k$, completes a circuit for the closing coil 75 of the circuit breaker 5 so that the trailing machine 3 is connected to the load circuit in place of the faulty leading machine 2. This circuit is from the ungrounded side of the load circuit, through the master element 6, conductor 32, contacts $e$ and $f$ of the change over switch 8, conductor 33, contacts $k$ of the contactor 11, conductor 71, protective contacts 73, conductor 74, closing coil 75 of the circuit breaker 5 to ground.

The contactor 11 by opening its contacts $g$ and closing its contacts $d$ connects the conductor 47 to the ungrounded side of the load circuit through conductor 83, contacts $l$ and $k$ of the change over switch 8, conductor 82 and auxiliary contacts 81 of the closed circuit breaker 5 instead of through conductor 46, contacts $o$ and $n$ of the change-over switch 8, conductor 45 and auxiliary contacts 42 of the circuit breaker 4 as described above.

The contactor 11, by opening its contacts $e$ and $f$, removes the control relays 18 and 21 from under the control of the voltmeter 12 and by closing its contacts $a$ and $b$ places the control relays 23 and 24 associated with the motor operated rheostat 17 under the control of the voltmeter 12. Therefore, the excitation of the generator 3 is automatically regulated to maintain constant voltage across the load circuit when it is operating in place of the leading machine 2.

The opening of the contacts of the master element 6, when the machine 3 is operating in place of the leading machine 2, opens the above traced circuits of the closing coil 75 of the circuit breaker 5 and the coil 40 of the time relay 10 so that generator 3 is disconnected from the load circuit and the time relay 10 opens its contacts 41 and interrupts the circuit of coil 109 of the contactor 11. The contactor 11, therefore, is restored to its normal position so that if the generator 2 and its associated apparatus are in an operative condition when the master element 6 is subsequently operated to effect the connection of the leading source 2, the circuit breaker 4, instead of the circuit breaker 5, is closed.

It will now be assumed that while the trailing generator 3 is operating in place of the leading generator 2, the circuit breaker 4 associated with the leading generator 2 is closed. Such a condition may occur when the failure of the leading machine to be connected to the load circuit is due to a temporary abnormal condition which causes one of the protective devices associated with the leading machine to maintain its contacts 35 open temporarily.

When the circuit breaker 4 closes, the opening of its auxiliary contacts 38 interrupts the heretofore described circuits of the time relay 10 and change over contactor 11. The opening of the contacts $a$, $b$ and $d$ of the contactor 11 removes the motor operated rheostat 17 from under the control of the voltage relay 12 and the closing of the contacts $e$, $f$ and $g$ places the motor operated rheostat 16 under the control of the voltage relay 12. Therefore, as soon as the leading machine is reconnected to the load circuit, its regulating means is placed under the control of the voltage relay 12.

The opening of the contacts $k$, when the contactor 11 is deenergized, interrupts the above traced circuit of the closing coil 75 of the circuit breaker 5. Since, however, both machines are still supplying current to the load circuit, the closing coil 75 is not deenergized because its above traced circuit through the contacts 76 and 78 of the reverse power relays 31 and 30 respectively, is completed.

If the master element 7 is open, so that the relay 9 is deenergized when the contacts $c$ of the contactor 11 are closed, the above traced circuit of the voltage reducing relay 24 is completed to reduce the output of the trailing machine 3. When the output has been decreased sufficiently to cause the reverse power relay 31 to open its contacts 76 in the circuit of the closing coil 75, the circuit breaker 5 opens and disconnects the generator 3 from the load circuit.

If the master element 7 is closed when the contacts $c$ of the contactor 11 are closed, the motor operated field rheostats 17 of the trailing machine 3 is controlled by the current balance relay 15 in the manner heretofore described.

From the above description and the drawing it will also be evident that in case the circuit breaker associated with the leading source is opened when both sources are in operation, the contactor 11 is energized and operates to remove the rheostat of the trailing source from under the control of current balance relay 15 and place it under the control of the voltage relay 12 so that while the trailing unit is operating alone the voltage thereof is maintained constant if the output thereof does not exceed the setting of ammeter associated therewith.

When it is desired to change the sequence in which the sources are connected to the load circuit 1 so that the genertor 3 is the leading source and the generator 2 is the trailing source, the change over switch is moved into its other position. The subsequent closing of the master element 6 then completes the circuit of the closing coil 75 of the circuit breaker 5 through the contacts $e$ and $d$ of the change over switch, and the circuit of the coil 40 of the time relay 10 through contacts $b$ and $a$ of the change over switch 8, conductor 111 and the auxiliary contacts 112 on the circuit breaker 5. If the circuit breaker 5 closes, the relay 10 does not have time to close its contacts and complete the circuit of the coil 109 of the contactor 11.

If the voltage is too high so that the voltmeter contacts 48 are closed after the circuit breaker 5 is closed, a circuit is completed for the voltage lowering control relay 24 to decrease the excitation of the generator 3. This circuit is from the ungrounded side of the load circuit, through the auxiliary contacts 81 on the circuit breaker 5, conductor 82, contacts $k$ and $j$ of the change over switch 8, conductor 46, contacts $g$ of the contactor 11, conductor 47, voltmeter contacts 48, conductor 49, contacts $f$ of the contactor 11, conductor 50, contacts $p$ and $q$ of the change over switch 8, conductor 101, coil 98 of the control relay 24, conductor 102, limit switch 103 to ground.

If the voltage decreases so that the voltmeter contacts 58 are closed, a circuit is completed for the voltage raising control relay 23 to effect an increase in the excitation of the generator 3 to restore the voltage to its normal value. This circuit is from the ungrounded terminal of the load circuit through the auxiliary contacts 81 on the circuit breaker 5, conductor 82, contacts $k$ and $j$ of the change over switch 8, conductor 46, contacts $g$ of the contactor 11, conductor 47, voltmeter contacts 58, conductor 59, contacts $e$ of the contactor 11, conductor 60, contacts $v$ and $w$ of the change over switch 8, conductor 89, ammeter contacts 90, conductor 91, coil 82' of the voltage raising control relay 23, conductor 92, limit switch 93, to ground.

In case the current output of the generator 3 exceeds a predetermined value, the ammeter 14 operates to interrupt the circuit of the control relay 23 and complete the circuit of the voltage lowering control relay 24 to effect a decrease in the excitation of the generator 3.

When it is desired to connect the trailing machine 2, the master element 7 is closed and the control relay 9 is energized. The closing of the contacts 69 of the control relay 9 completes the circuit of the closing coil 37 of the circuit breaker 4. This circuit is from the ungrounded side of the load circuit through the contacts 69 of the control relay, conductor 70, contacts $h$ and $g$ of the change over switch 8, conductor 33, protective contacts 35, conductor 36, closing coil 37 to ground. The closing of the circuit breaker 4 connects the generator 2 to the load circuit.

After the circuit breaker 4 is closed, the motor operated rheostat 16 is controlled by the current balance relay 15. When the current output of the generator 3 increases sufficiently relative to the current output of the generator 2 to cause the relay 15 to close its contacts 97 a circuit is completed for the voltage raising control relay 18 to effect an increase in the excitation of the generator 2 to restore the desired load division between the two generators. This circuit is from the ungrounded side of the load circuit through the conductor 44, auxiliary contacts 42 on the circuit breaker 4, conductor 45, contacts $n$ and $m$ of the change over switch 8, conductor 83, contacts $c$ of the contactor 11, conductor 84, contacts 97 of the relay 15, conductor 99, contacts $cc$ and $bb$ of the change over switch 8, conductor 86, contacts 87 of the control relay 9, conductor 88, contacts $y$ and $z$ of the change over switch 8, conductor 61, ammeter contacts 43, conductor 62, coil 63 of the voltage raising $x$ control relay 18, conductor 64, limit switch 65 to ground.

When the current output of the generator 2 decreases sufficiently relative to the current output of the generator 3 to cause the relay 15 to close its contacts 80, a circuit is completed for the voltage lowering control relay 21 to effect a decrease in the excitation of the generator 2 to restore the desired load division between the two generators. This circuit is the same as the circuit just described as far as conductor 84, then through the contacts 80 of the relay 15, conductor 85, contacts *ff* and *ee* of the change over switch 8, conductor 100, contacts *s* and *t* of the change over switch 8, conductor 51, coil 52 of the voltage lowering control relay 21, conductor 53, limit switch 54 to ground.

From the above description it will be evident that when change over switch 8 is operated to change the sequence in which the generators 2 and 3 are connected to the load circuit 1, the circuits of the control relays of the motor operated rheostats 16 and 17 are also changed so that normally the control relays for the rheostat associated with the generator which is the leading machine are controlled by the voltmeter 12 and the control relays for the rheostat associated with the trailing machine are controlled by the current balance relay 15.

Since the contacts of both of the reverse current relays 30 and 31 are closed when both of the generators are supplying current to the load circuit, it is evident that the circuit of the closing coil 37 of the circuit breaker 4 remains completed through the contacts of these relays after master element 7 has been operated to effect the deenergization of the control relay 9. Since the contacts 87 of the control relay 9 are in the above traced circuit for the voltage raising control relay 18 and the contacts 107 connect together the conductors 84 and 100 in the circuit of the voltage lowering control relay 21, it is evident that the load is gradually shifted to the leading machine 3 before the relay 30 opens its contacts 78 and effects the opening of the circuit breaker 4.

If, for any reason whatever, the circuit breaker 5 fails to close within a predetermined time after the master element 7 is operated to effect the starting of the leading machine 3, or the circuit breaker 5 opens and remains open for a predetermined length of time so that the circuit for the coil 40 of the time relay 10 through the auxiliary contacts 112 on the circuit breaker 5 remains closed for a sufficient length of time to permit the time relay 10 to close its contacts 41, the coil 109 of the contactor 11 is energized to effect the closing of the circuit breaker 4. The circuit of the closing coil 37 of the circuit breaker 4 is from the ungrounded side of the load circuit 1 through the master element 6, conductor 32, contacts *e* and *d* of the change over switch 8, conductor 71, contacts *k* of the contactor 11, conductor 33, protective contacts 35, conductor 36, closing coil 37 to ground.

After the circuit breaker 4 is closed the control relays 18 and 21 of the motor operated rheostat 16 are controlled by the voltmeter 12 to maintain a constant voltage across the load circuit. When the voltmeter contacts 58 are closed a circuit for the voltage raising control relay 18 is completed. This circuit is from the ungrounded side of the load circuit, conductor 44, auxiliary contacts 42 on the circuit breaker 4, conductor 45, contacts *n* and *m* of the change over switch 11, conductor 83, contacts *d* of the contactor 11, conductor 47, voltmeter contacts 58, conductor 59, contacts *a* of the contactor 11, conductor 88, contacts *y* and *z* of the change over switch 8, conductor 61, ammeter contacts 43, conductor 62, coil 63 of the voltage raising control relay 18, conductor 64, contacts 65 to ground. When the voltmeter contacts 48 are closed, a circuit for the voltage lowering control relay 21 is completed. This current is the same as the one just traced as far as the conductor 47, then through the voltmeter contacts 48, conductor 49, contacts *b* of the contactor 11, conductor 100, contacts *s* and *t* of the change over switch 8, conductor 51, coil 52 of the voltage lowering control relay 21, conductor 53, limit switch 54 to ground.

Since the circuit of the time relay coil 40 includes the contacts of the master element 6, it is evident when the master element is operated so that the circuit breaker 4 opens, the time relay 10 and the contactor 11 are deenergized so that the leading machine may be connected to the load circuit upon the subsequent operation of the master element if it is in operative condition at that time.

From the above description and drawing it will be evident that when the trailing unit 2 is operating alone, the motor operated rheostat 16 associated therewith is controlled by the voltage relay 12. When the leading machine 3 is reconnected to the load circuit so that the contactor 11 becomes deenergized, the motor operated rheostat 17 is placed under the control of the voltage relay 12 and the motor operated rheostat 16 is placed under the control of the current balance relay 15 if the master element 7 is closed. If the master element 7 is open the motor operated rheostat 17 is operated to decrease the output of the trailing source 2 until it is disconnected from the load circuit.

Also it will be evident that in case the circuit breaker 5 associated with the leading source 3 is opened when both sources are connected to the load circuit, the contactor 11 is energized and operates to remove the rheostat 16 from under the control of the current balance relay 15 and place it under the control of the voltage relay 12.

While I have, in accordance with the patent statutes, shown and described my invention as applied to a particular system and as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States is:—

1. In a system of electric distribution comprising a load circuit and a plurality of sources of current connected thereto, an arrangement for automatically disconnecting one of the sources comprising regulating means for decreasing the output of said one of said sources, and switching means for disconnecting said one of said sources from said load circuit, and means for effecting the operation of said switching means when said regulating means has decreased the output of said one of said sources to a predetermined value.

2. In a system of electric distribution comprising a direct current load circuit and two direct current sources connected thereto, one of which is a dynamo electric machine, means for automatically disconnecting said machine from said load circuit while the other source is connected thereto, comprising switching means and regulating means for decreasing the excitation of said machine prior to actuation of said switching means.

3. In a system of electric distribution comprising a direct current load circuit and two direct current generators connected thereto, an arrangement for automatically disconnecting one of said generators from the load circuit while the other generator is connected thereto comprising regulating means for decreasing the excitation of said one of said generators, switching means for disconnecting said one of said generators from said load circuit, and means for effecting the operation of said switching means when the excitation has been reduced sufficiently to produce a reversal of current through said one of said generators.

4. In a system of electric distribution, a load circuit, two sources of current connected to said load circuit, switching means associated with each source for connecting it to said load circuit, regulating means for maintaining a predetermined division of the load between said sources as the load connected to said load circuit varies, and means for disconnecting one of said sources comprising a device adapted to be operated when said disconnection is to be effected, means controlled by said device for rendering said regulating means inoperative to maintain the predetermined division of the load between said sources and operative to decrease the output of the source to be disconnected, and means for effecting the operation of the switching means associated with the source to be disconnected to disconnect said source when the output of said source has been decreased to a predetermined value.

5. In a system of electric distribution, a load circuit, a source of current connected to said load circuit, regulating means for said source normally operative to maintain a predetermined condition of the output thereof and means for disconnecting said source comprising a device adapted to be operated when said source is to be disconnected means controlled by said device to render said regulating means inoperative to maintain said predetermined condition and operative to decrease the current output of said source, and means operative when the current output has been decreased to a predetermined value to disconnect said source from said circuit.

6. In a system of electric distribution, a direct current load circuit, a dynamo electric machine connected to said circuit, regulating means for varying the excitation of said machine, a control device for said regulating means, a master element adapted to be operated when disconnection of said machine from said circuit is to be effected, means controlled by said master element for removing said regulating means from the control of said control device and for effecting the operation of said regulating means to decrease the excitation of said machine so as to decrease the output thereof, and means operative to disconnect said machine from said circuit when the excitation has been reduced by said regulating means so as to produce a predetermined condition in said machine.

7. In a system of electric distribution, a direct current load circuit, a dynamo electric machine connected to said circuit, regulating means for varying the excitation of said machine, a control device for said regulating means, a master element adapted to be operated when disconnection of said machine from said circuit is to be effected, means controlled by said master element for removing said regulating means from the control of said control device and for effecting the operation of said regulating means to decrease the excitation of said machine so as to decrease the output thereof, and a reverse current relay operative to cause the disconnection of said machine from said circuit when current flows from said circuit to said machine.

8. In a system of electric distribution, a direct current load circuit, two direct current generators connected thereto, a circuit breaker between each generator and the load circuit, a motor operated field rheostat for each generator, a control device responsive to the relative current outputs of said generators for controlling one of said rheostats to maintain a predetermined division of the load between said generators, a master element adapted to be operated when it is desired to disconnect the generator whose rheostat is controlled by said control device, means controlled by said master element for removing said one of said rheostats from the control of said control device and for effecting the operation of said one of said rheostats to decrease the excitation of the associated generator, and a reverse current relay for effecting the opening of the circuit breaker between the generator to be disconnected and the load circuit when the excitation of the generator has been decreased sufficiently to cause a reverse current to flow through the generator.

9. In a system of electric distribution, a direct current load circuit, two direct current generators connected to said load circuit, a circuit breaker between each generator and the load circuit, regulating means for maintaining a predetermined division of the load between said generators, and means for disconnecting one of said generators comprising a device adapted to be operated when it is desired to effect said disconnection, means controlled by said device for rendering said regulating means inoperative to maintain the predetermined division of the load between said generators and operative to decrease the excitation of the generator to be disconnected, and means operative to effect the opening of the circuit breaker between the load circuit and the generator to be disconnected when the excitation of said generator has been decreased sufficiently to produce a predetermined condition therein.

10. In a system of electric distribution, a load circuit, two sources of current connected to said load circuit, voltage regulating means for one of said sources, and regulating means responsive to the relative current outputs of the two sources for controlling the output of the other one of said sources.

11. In a system of electric distribution, a load circuit, two generators connected to said load circuit, excitation regulating means for each generator, a voltage responsive device for controlling one of said regulating means, and a differential relay responsive to the relative current outputs of said generators for controlling the other regulating means.

12. In a system of electric distribution, a load circuit, two generators connected to said load circuit, excitation regulating means for each generator, a voltage responsive device, a differential relay responsive to the relative current outputs of said generators, and switching means for controlling the connections of said regulating means whereby either of said regulating means may be controlled by said voltage responsive device and the other regulating means may be controlled by said differential relay.

13. In a system of electric distribution, a load circuit, two sources of current, regulating means associated with each source for controlling the output thereof, two control devices, and switching means for controlling the connections of said regulating means whereby either of said regulating means may be controlled by one of said control devices and the other regulating means may be controlled by the other control device.

14. In a system of electric distribution, a direct current circuit, two direct current generators connected to said circuit, a motor operated field rheostat associated with each generator for varying the excitation thereof, control relays associated with each rheostat, a voltage relay responsive to the voltage of said circuit, a balance relay having opposing coils respectively energized in accordance with current outputs of said generators, and switching means for controlling the connections of said control relays whereby the control relays associated with either of the rheostats may be placed under the control of said voltage relay and the control relays associated with the other rheostat may be placed under the control of the balance relay.

15. In a system of electric distribution, a load circuit, a plurality of sources of current, switching means associated with each source for effecting the connection thereof to said circuit, a plurality of master elements adapted to be operated in a predetermined sequence to effect the successive operation of said switching means to connect said sources to said load circuit, regulating means associated with each source, a plurality of control devices, and means for changing the sequence in which said switching means are operated by said master elements and for placing said regulating means under the control of different control devices.

16. In a system of electric distribution, a load circuit, two sources of current, switching means associated with each source for effecting the connection thereof to said circuit, a master element for effecting the operation of one of said switching means to connect the source associated therewith to said circuit, a second master element operative after said first mentioned master element has effected the operation of said one said switching means to effect the operation of the other one of said switching means to connect the source associated therewith to said circuit, regulating means with each source, two control devices, and means for placing either of said switching means under the control of said first mentioned master element, the regulating means associated with the source whose switching means is controlled by said first mentioned master element under the control of one of said control devices, the other switching means under the control of said second master element, and the other regulating means under the control of the other control device.

17. In a system of distribution, a load circuit, two sources of current, switching means associated with each source for effecting the connection thereof to said circuit, a master element adapted to be operated when connection of one of said sources to said circuit is to be effected, regulating means associated with each source, a control device and means for placing either of said switching means under the control of said master element and the regulating means of the selected source under the control of said control device.

18. In a system of distribution, a direct current load circuit, two direct current generators, switching means associated with each generator for effecting the connection thereof, to said circuit, a master element adapted to be operated when it is desired to effect the connection of one of said generators to said circuit, excitation controlling means for each generator, a control device responsive to a predetermined condition of said circuit, and means for placing either of said switching means under the control of said master element and the excitation controlling means of the selected generator under the control of said voltage responsive control device.

19. In a system of distribution, a direct current load circuit, two direct current generators, switching means associated with each generator for effecting the connection thereof to said circuit, a master element adapted to be operated when it is desired to effect the connection of a generator to said circuit, a motor-operated field rheostat associated with each generator for varying the excitation thereof, control relays associated with each rheostat, a relay responsive to the voltage of said circuit, and means for placing either of said switching means under the control of said master element and the control relays associated with the rheostat of the selected generator under the control of said voltage responsive relay.

20. In a system of distribution, a load circuit, two sources of current, switching means associated with each source for effecting the connection thereof to said circuit, a master element adapted when in a predetermined position to effect the operation of one of said switching means to connect the source associated therewith to said circuit, regulating means for each source, a control device for controlling the operation of the regulating means of the source associated with said one of said switching means when said source is connected to said circuit, and means operative to effect the connection of the other source to said circuit and to place the regulating means of said other source under the control of said control device, upon the failure of said one of said switching means to effect the connection of the source associated therewith to said circuit when said master element is in said predetermined position.

21. In a system of distribution, a load circuit, two direct current generators, switching means associated with each generator for effecting the connection thereof to said circuit, a master element operative when in a predetermined position to effect the operation of one of said switching means to connect the generator associated therewith to said circuit, excitation controlling means for each generator, a relay responsive to a predetermined condition of said circuit for controlling the excitation controlling means of the generator associated with said one of said switching means after said generator has been connected to said circuit, and means operative to effect the connection of the other generator to said circuit and to place the regulating means of said other generator under the control of said relay upon the failure of said one of said switching means to effect the connection of the generator associated therewith to said circuit when said master element is in said predetermined position.

22. In a system of distribution, a load circuit, two direct current generators, switching means associated with each generator for effecting the connection thereof to said circuit, a master element adapted when in a predetermined position to effect the operation of one of said switching means to connect the generator associated therewith to said circuit, a motor operated field rheostat associated with each generator for varying the excitation thereof, control relays associated with each rheostat, a relay responsive to the voltage of said circuit for controlling the control relays associated with the rheostat of said generator which is connected to the load circuit when said master element is in said predetermined position, and means operative to effect the connection of the other generator to said circuit and to place the control relays associated with the other motor operated rheostat under the control of said relay upon the failure of said one of said switching means to effect the connection of the generator associated therewith to said circuit.

23. In a system of distribution, a direct current load circuit, two direct current generators, switching means associated with each generator for connecting it to said circuit, a master element, a second master element, excitation controlling means for each generator, a voltage relay responsive to the voltage of said circuit, a control device responsive to the relative current outputs of said generators, and a change over switch for placing either of said switching means under the control of said first mentioned master element, the excitation controlling means of the selected generator under the control of said voltage device, the other switching means under the control of said second master element and the excitation controlling means of the generator whose switching means is controlled by said second master element under the control of said control device which is responsive to the relative outputs of said generators.

24. In a system of distribution, a direct current load circuit, two direct current generators, switching means associated with each generator for connecting it to said circuit, a master element adapted to be operated when it is desired to effect the connection of one generator to said circuit, a second master element adapted to be operated when it is desired to effect the connection of a second generator to said circuit, a motor operated field rheostat for each generator, control relays associated with each rheostat, a relay responsive to the voltage of said circuit, a differential relay having two opposing windings respectively energized in response to the current outputs of the two generators, and a change over switch for placing either of said switching means under the control of said first mentioned master element, for placing the control relays of the rheostat associated with the generator whose associated switching means is selected under the control of said voltage relay, for placing, the other switching means under the control of said second master element, and for placing the other control relays under the control of said differential relay.

25. In a system of distribution, a load circuit, two sources of current, switching means associated with each source, a master element adapted to be operated to effect the connection of one of said sources to said circuit, regulating means associated with each source, a control device, means for placing either of said switching means under the control of said master element and the regulating means of the selected source under the control of said control device, and means operative to place the other switching means under the control of said master element and the regulating means of the source associated with said other switching means under the control of said control device, when the switching means normally placed under the control of said master element fails to connect its associated source to said circuit.

26. In a system of distribution, a direct current load circuit, two direct current generators, switching means associated with each generator for connecting it to said circuit, a master element adapted to be operated to effect the connection of one of said generators to said circuit, excitation controlling means for each generator, a control device responsive to a predetermined condition of said circuit, means for placing either of said switching means under the control of said master element and the excitation controlling means of the selected generator under the control of said control device, and means operative to place the other switching means under the control of said master element and the excitation controlling means for the generator associated with said other switching means under the control of said control device, when the switching means normally placed under the control of said master element fails to connect its associated generator to said circuit.

27. In a system of distribution, a direct current load circuit, two direct current generators, switching means associated with each generator for connecting it to said circuit, a master element adapted to be operated to effect the connection of one of said generators to said circuit, a motor-operated field rheostat associated with each generator for varying the excitation thereof, control relays associated with each rheostat, a relay responsive to the voltage of said circuit, means for placing either of said switching means under the control of said master element and the control relays associated with the rheostat of the selected generator under the control of said voltage responsive relay, and means operative to place the other switching means under the control of said master element and the control relays associated with the other rheostat under the control of said voltage responsive relay, when the switching means normally placed under the control of said master element fails to connect its associated generator to said circuit within a predetermined time.

28. In a system of electric distribution, a load circuit, two sources of current, switching means for connecting each source to said circuit, regulating means associated with each source for controlling the output thereof, two control devices, and means for placing the regulating means of whichever source is the first to be connected to said load circuit under the control of one of said control devices and the regulating means of the second source to be connected to said load circuit under the control of the other control device.

29. In a system of electric distribution, a direct current circuit, two generators adapted to be connected to said circuit, regulating means associated with each generator, for varying the excitation thereof, two control devices, and means for placing the regulating means of whichever generator is the first to be connected to said circuit under the control of one of said control devices and the regulating means of the second generator to be connected to said source under the control of the other control device.

30. In a system of electric distribution, a direct current circuit, two generators adapted to be connected to said circuit, regulating means associated with each generator for varying the excitation thereof, a voltage relay responsive to the voltage of said circuit, a current balance relay responsive to the relative current outputs of the two generators, and means for placing the regulating means of whichever generator is the first to be connected to said circuit under the control of said voltage relay and the regulating means of the second generator to be connected to said circuit under the control of said current balance relay.

31. In a system of electric distribution, a load circuit, two sources of current, switching means associated with each source for effecting the connection thereof to said load circuit, regulating means for each source, a control device, and means operative to place the regulating means of a predetermined one of said sources under the control of said control device whenever the switching means associated with said predetermined one of said sources has effected a predetermined connection and to place the regulating means of the other source under the control of said control device when said other source is connected to said load circuit and the switching means associated with said predetermined one of said sources has not effected said predetermined connection.

32. In a system of electric distribution, a load circuit, two dynamo electric machines for supplying current to said load circuit, regulating means associated with each machine, switching means associated with each machine for effecting the connection thereof to said load circuit, a control relay responsive to the voltage of said load circuit, means operative to place the regulating means of a predetermined one of said machines under the control of said relay whenever the switching means associated with said predetermined one of said machines has effected a predetermined connection, and means operative only when the switching means associated with said predetermined one of said machines has failed to effect a predetermined connection to place the regulating means associated with the other machine under the control of said relay.

33. In a system of electric distribution, a load circuit, two sources of current, switching means associated with each source for effecting the connection thereof to said load circuit, regulating means associated with each source, a control device, a master element normally arranged when in a predetermined position to effect the operation of the switching means associated with a predetermined one of said sources to connect said predetermined one of said sources to said load circuit and to place the regulating means of said predetermined one of said sources under the control of said control device, and means operative only when the switching means associated with said predetermined one of said source is in a predetermined condition and said master element is in said predetermined position to effect the connection of the other source to said circuit and to place the regulating means associated with said other source under the control of said control device.

34. In a system of electric distribution, a load circuit, two sources of current, switching means associated with each source for effecting the connection thereof to said load circuit, regulating means associated with each source, a control device, a master element normally arranged when in a predetermined position to effect the operation of the switching means associated with a predetermined one of said sources to effect the connection thereof to said load circuit and to place the regulating means of said predetermined one of said sources under the control of said control device, electromagnetically operated means arranged when energized to effect the operation of the switching means associated with the other source to connect said other source to said circuit and to place the regulating means of said other source under the control of said control device, and a circuit for said electromagnetically operated means controlled by said master element and the switching means associated with said predetermined one of said sources whereby said circuit is completed only when said master element is in said predetermined position and the switching means associated with said predetermined one of said sources has failed to effect a predetermined connection.

35. In a system of electric distribution, a load circuit, two sources of current, switching means associated with each source for effecting the connection thereof to said load circuit, regulating means for each source, a control device, a second control device, means operative to place the regulating means of a predetermined one of said sources under the control of said first mentioned control device whenever the switching means associated with said predetermined one of said sources has effected a predetermined connection, and means operative to place the regulating means of the other source under the control of said first mentioned control device when the switching means associated with said other source has effected a predetermined connection and the switching means associated with said predetermined one of said sources has not effected a predetermined connection and under the control of said second control device when both switching means have effected predetermined connections.

36. In a system of electric distribution, a load circuit, two dynamo electric machines for supplying current to said load circuit, regulating means associated with each machine, switching means associated with each machine for effecting the connection thereof to said load circuit, a control relay responsive to the voltage of said load circuit, a second control relay responsive to the relative current outputs of said machine, means operative to place the regulating means of a predetermined one of said machines under the control of said voltage responsive control relay whenever the switching means associated with said predetermined one of said machines has effected a predetermined connection, means operative to place the regulating means of the other machine under the control of said second control relay whenever both of said switching means have effected predetermined connections, and means operative to place the regulating means of said other machine under the control of said voltage responsive control relay when the switching means of said other machine has effected a predetermined connection and the switching means associated with said predetermined one of said machines has not effected a predetermined connection.

37. In a system of electric distribution, a load circuit, two dynamo electric machines for supplying current to said load circuit, regulating means associated with each machine, switching means associated with each machine for effecting the connection thereof to said load circuit, a control relay responsive to the voltage of said load circuit, a second control relay responsive to the relative current outputs of said machines, means for placing the regulating means of a predetermined one of said machines under the control of said voltage responsive control relay whenever said predetermined one of said machines is connected to said load circuit, means for placing the regulating means of the other machine under the control of said second control relay whenever both of said machines are connected to said load circuit, and means for placing the regulating means of said other machine under the control of said voltage responsive control relay when said other machine is connected to said load circuit and said predetermined one of said machines is not connected to said load circuit.

38. In a system of electric distribution, a load circuit, two dynamo electric machines for supplying current to said load circuit, switching means associated with each machine for connecting it to said load circuit, regulating means for each machine, a control relay responsive to the voltage of said load circuit, a second control relay responsive to the relative current outputs of said machines, a master element normally arranged when in a predetermined position to effect the operation of the switching means associated with a predetermined one of said machines to connect said predetermined one of said machines to said circuit, means for placing the regulating means of said predetermined one of said machines under the control of said voltage responsive control relay when the switching means associated with said predetermined one of said machines has effected a predetermined connection, a second master element normally arranged when in a predetermined position to effect the operation of the switching means associated with the other machine to connect said other machine to said load circuit, means for placing the regulating means of said other machine under the control of said second control relay when the switching means associated with both of said machines have effected predetermined connections, electromagnetically operated means arranged when energized to effect the operation of the switching means associated with said other machine to connect said other machine to said load circuit and to place the regulating means of said other machine under the control of said voltage responsive control relay, and a circuit for said electromagnetically operated means controlled by said first mentioned master element and the switching means associated with said predetermined one of said machines whereby said circuit is completed only when said first mentioned master element is in said predetermined position and the switching means associated with said predetermined one of said machines has failed to effect a predetermined connection.

In witness whereof, I have hereunto set my hand this 13th day of June, 1925.

HERMAN BANY.